Patented Aug. 7, 1945

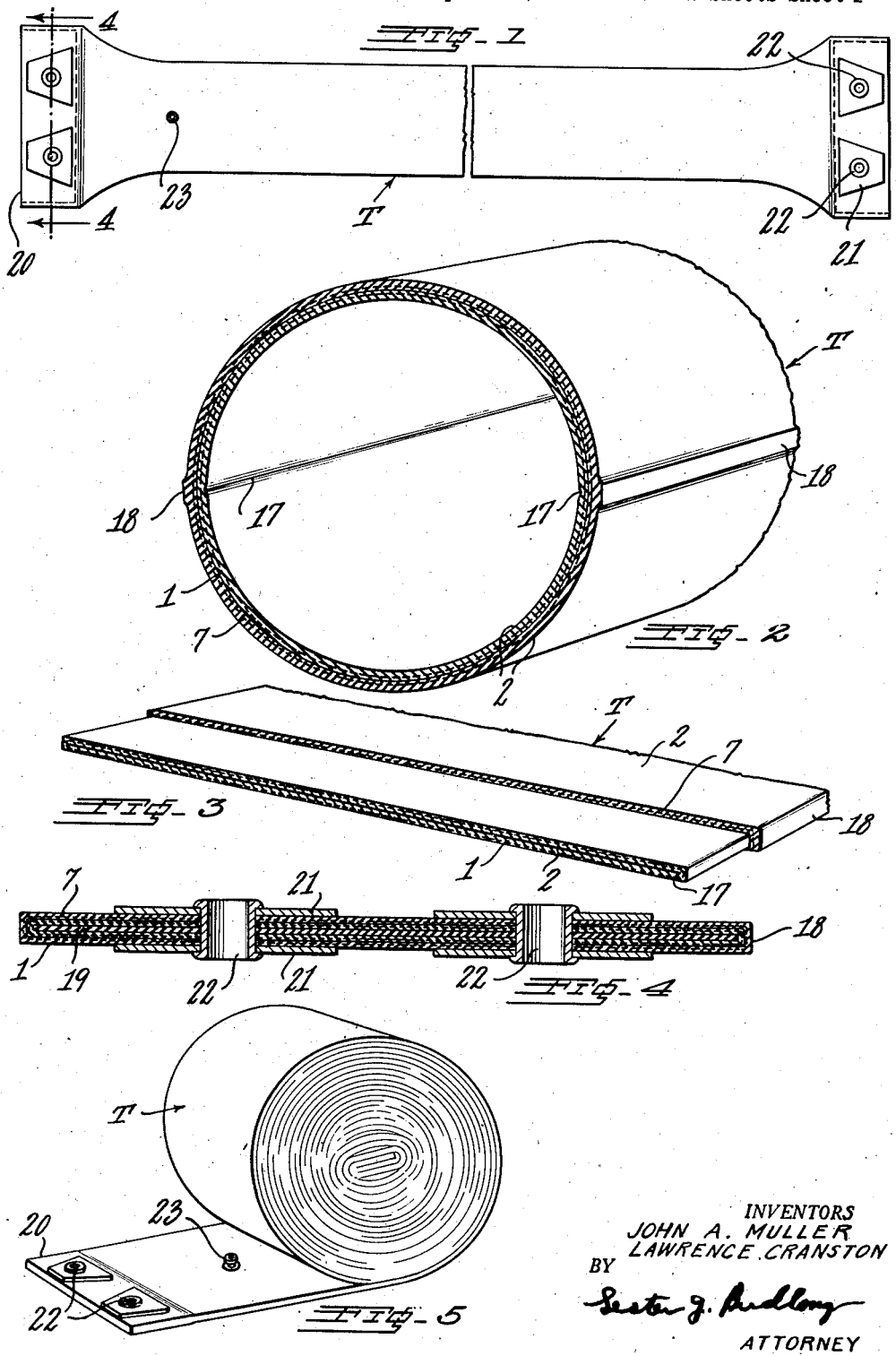

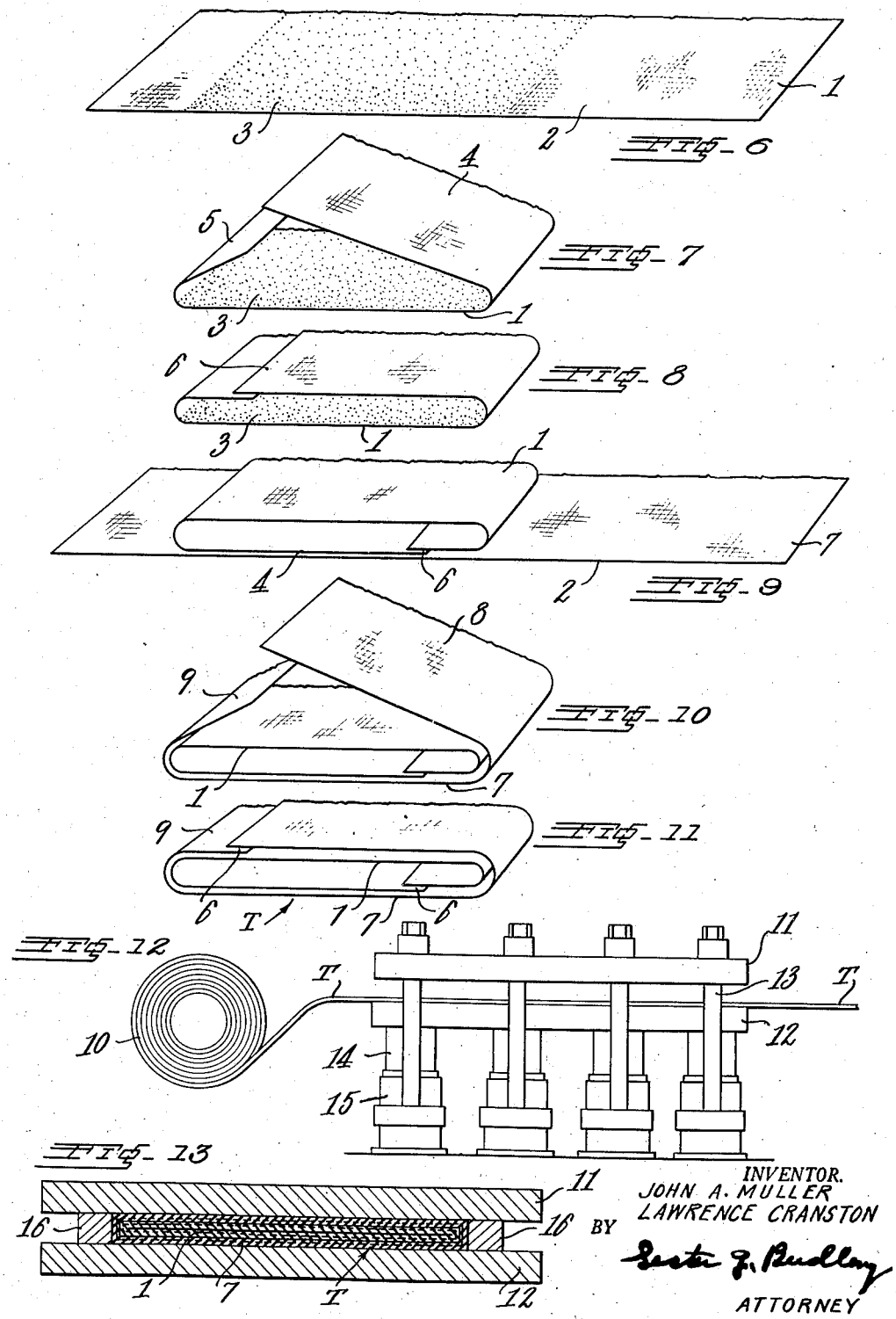

2,381,074

UNITED STATES PATENT OFFICE 2,381,074

METHOD OF MAKING INFLATABLE HOSE

John A. Muller, Ridgewood, and Lawrence Cranston, Glen Rock, N. J., assignors to United States Rubber Company, New York, N. Y., a corporation of New Jersey Application April 29, 1942, Serial No. 440,994

4 Claims. (Cl. 154—8)

This invention relates to a novel hose or tube formed of rubberized fabric and more particularly to the method of making the same.

Heretofore, two well known methods have been employed for making a hose or tube from fabric treated with rubber.

One such method is to use a mandrel that is placed inside of the unvulcanized hose or tube to maintain the same in a round tubular condition during vulcanization.

The other method, known as the lead sheath method, is carried out by extruding a lead jacket upon the finished but unvulcanized hose to confine the hose during vulcanization, the lead sheath being removed after the hose is vulcanized.

The first method permits the manufacture of tubes of any desired size from a fraction of an inch up to several feet in diameter, but is limited as to length since it is not practical to use a mandrel much longer than fifty feet.

The second method permits the manufacture of tubes of great length but is limited as to size since it is not practical to make a tube by this method more than several inches in diameter.

In both of these methods the hose or tube is retained in a round tubular condition during vulcanization, and in each method different size apparatus is required for each different size hose or tube to be made.

The present invention contemplates a method whereby a hose or tube of any desired size and of any desired length may be made, thereby avoiding the limitation as to length of the first method above described, and the limitation as to size of the second method. Furthermore, by employing the method of the present invention the same apparatus may be used to make different size tubes varying in diameter from less than an inch to several feet in diameter.

A primary feature of the present invention resides in the method whereby the hose or tube is vulcanized in a flatly pressed condition instead of a round condition as heretofore. A hose or tube constructed by this method is easy to distinguish from those constructed heretofore, in that the present hose or tube has permanent lines of fold along its opposite sides which enable it to lie in a completely flat condition when not inflated. This makes the present hose easy to roll up into a compact package when not in use.

A hose or tube constructed in accordance with the present invention may be employed to conduct or confine any one of a number of liquids or gases. It is well adapted for use as a fire hose or air hose, but was developed more particularly to provide an inflatable tubular pontoon which may be a hundred feet or more in length and approximately a foot in diameter when inflated. Such a pontoon was produced by simply closing the ends of the present tube and then inflating the tube with air.

The above and other features of the present invention will be more clearly understood from the following description when read in connection with the accompanying drawings illustrating the present hose and method of making the same.

In the drawings:

Fig. 1 is a plan view of an inflated tubular pontoon constructed in accordance with the present invention.

Fig. 2 on an enlarged scale is a sectional perspective view through the hose or pontoon of Fig. 1.

Fig. 3 is a sectional perspective view of the tube of Fig. 2 when deflated, the outer fabric ply being partly removed.

Fig. 4 on an enlarged scale is a section taken on line 4—4 of Fig. 1.

Fig. 5 is a perspective view showing the tubular pontoon of Fig. 1 deflated and rolled up into a compact roll.

Fig. 6 is a diagrammatic perspective view of a strip of rubberized fabric adapted for use in making one of the plies of the present hose or tube.

Fig. 7 is a similar view showing the side portions of the fabric strip of Fig. 6 folded inwardly towards each other.

Fig. 8 is a similar view showing the side portions folded inwardly into overlapping relation and having the overlapped edges secured together.

Fig. 9 is a similar view showing the tubular member of Fig. 8 deposited on a second sheet of rubberized fabric with the overlapping edge seam turned down against this fabric.

Fig. 10 is a similar view showing the outer fabric partly folded about the inner tube of Fig. 8.

Fig. 11 is a similar view showing the outer fabric completely applied about the inner tube to form a multi-ply hose or tube ready to be vulcanized.

Fig. 12 is a side elevation of a conventional platen press or vulcanizing press; and Fig. 13 is a sectional view through the press of Fig. 12.

In making a hose or tube in accordance with the present invention any suitable rubberized fabric may be used, but the material preferably employed is a canvas of the desired weight for the size and strength of the particular tube to be constructed. This canvas is preferably impregnated or coated with a sufficient amount of rubber to afford the canvas the desired amount of protection and to render it impervious to the liquid or gas which the tube is designed to confine. The rubber applied to the canvas should also be sufficient to bond one canvas ply to another in a multi-ply construction.

There is shown in Fig. 6 of the drawings a sheet of fabric 1 such as ordinary woven canvas of the desired width and having a coating 2 of unvulcanized rubber upon its upper face. This coating may be applied to the canvas as a skim coat, and the opposite face of the fabric is preferably impregnated with rubber frictioned thereupon.

In carrying out the present invention, as above mentioned, the hose or tube is vulcanized in a flat condition. It is therefore important to introduce within the tube an adhesion preventing agent such as indicated by 3 and which will serve to prevent the upper and lower walls of the interior of the tube from adhering together when the tube is being vulcanized with these walls pressed firmly together. To this end there may be applied to the upper face of the rubber coating 2 as shown in Fig. 6 or introduced within the tube, any one of a number of materials which will prevent the surfaces from adhering together during vulcanization. Some such materials which can be used satisfactorily are soap stone, soap, water-glass, Holland sheeting, etc.

The unvulcanized rubberized fabric strip of Fig. 6 of the desired width is formed into a tube by folding inwardly the longitudinal side portions 4 and 5, by any well known means, so as to bring the side portions towards each other as shown in Fig. 7. These side portions are then folded into over-lapping relation so that the over-lapping edges may be secured together as indicated by 6 in Fig. 8 to form a tube having the rubber coating 2 forming the inner wall thereof. This completes the formation of the unvulcanized inner tube of Fig. 8, and the same could be vulcanized in accordance with the present invention to provide a hose or tube of a single ply thickness.

It is desirable, however, in many cases to form the hose or tube with two or more plies and therefore the tube of Fig. 8 is shown in Fig. 9 as having been turned over so that its seam 6 faces downwardly when this tube is placed upon a second rubberized sheet 7, which sheet may be similar to that shown in Fig. 6 except that it is preferably slightly wider and has the rubber covered surface 2 thereupon so positioned that this coated surface will lie at the outside of the finished hose or tube. After the parts are placed as shown in Fig. 9, the longitudinal side portions 8 and 9 of the rubberized fabric 7 are folded inwardly towards each other about the inner tube of Fig. 8 as shown in Fig. 10, whereupon the overlapping edges of the side portions 8 and 9 are secured together as shown in Fig. 11, wherein it will be noted that the seams 6 are well spaced from each other.

This completes the operation of building up the two-ply unvulcanized hose or tube shown in Fig. 11 and designated by the letter T, and the same is now ready to be vulcanized. If the hose or tube T is of relatively great length, it will be preferable to wind it up into a roll such as indicated by 10 in Fig. 12 to facilitate handling the same. It may then be vulcanized in accordance with the present invention by advancing successive lengths thereof through a platen press or vulcanizing press of usual construction. Such a press is shown in Fig. 12 as provided with an upper fixed plate or platen 11 and a lower moveable plate or platen 12. The upper plate is supported in a fixed position by the bolts 13 and the lower plate is adapted to be raised and lowered by the hydraulic plungers 14 which slide within the operating cylinders 15.

It is important in vulcanizing this hose or tube in a flat condition, to take steps to prevent the rubber at the inner and outer face of the tube at the fold from being unduly displaced by the flowing action caused by the heat and pressure of the press. This is accomplished when the construction of Fig. 13 is employed by providing between the plates 11 and 12 the side irons or edge strips 16 which are so positioned within the vulcanizing press that they will serve as abutting shoulders or supports for the opposite edges of the folded tube during vulcanization as will be apparent from Fig. 13. These side irons should be of slightly less thickness than the compressed tube within the vulcanizer so that they will fully support the side edges of the tube without preventing the tube from being subjected to the pressure of the press.

It will be seen that when the construction of Fig. 13 is employed, the tube is fully confined at its upper and lower faces and at its side edges during vulcanization, and in this manner the rubber at the points of fold is prevented from being unduly squeezed away from either the inner or outer face of the fabric adjacent the folded edges.

It is not necessary, however, in all cases to employ the side irons 16 shown in Fig. 13 since undue displacement of the rubber from the fabric within the vulcanizing press at the points of fold may be avoided by subjecting the tubular roll indicated by 10 in Fig. 12 to a preliminary or partial vulcanization in an open heater or steam vulcanizer, to thereby set the rubber at the points of fold sufficiently to prevent the rubber from flowing unduly at these points under the action of the heat and pressure to which it will be subjected in the vulcanizer of Fig. 12.

As soon as one longitudinal portion of the hose or tube is vulcanized by the apparatus shown in Fig. 12 the press may be opened and the next length introduced therein, to thereby vulcanize successive portions of the tube throughout its entire length, whereupon the tube will be finished and ready for service, except possibly for equipping the ends thereof with threaded connections or other desired attachments.

Since this hose or tube was vulcanized in a flattened condition, there will be formed at diametrically opposite points along the inner surface thereof the permanent lines of fold indicated by 17 in Fig. 2, and there will be formed along the outer face of the tube the slightly discernible rubber ribs 18 produced by the pressure of the side irons 16 against the tube at these points. The ribs 18 however will be less apparent if the surfaces of the side irons 16 which form these ribs are curved to conform to the curvature of the outer wall of the inflated tube.

The method of the present invention, as above stated, was developed primarily to provide inflated tubular pontoons of approximately a foot in diameter when the tube is inflated and of great length. In order that this tube might be inflated it was necessary to seal the ends thereof. This was readily done by removing the adhesive preventing material from each end of the tube for a short distance and then introducing therein a strip of unvulcanized rubber 19 of sufficient width to extend from one folded edge of the tube to the other as shown in Fig. 4, and then place these flattened ends 20 of the tube in a platen press to vulcanize the walls of the tube together by means of the rubber 19. The ends 20 were then provided with grommets consisting of the side plates 21 firmly secured to the opposite faces of the flattened ends 20 by the hollow rivets 22. The tubular pontoon of Fig. 1 is preferably provided with a valve 23 of any suitable construction so that the pontoon may be inflated with air, whereupon it is finished ready for use.

The inflated tubular pontoon of Fig. 1 may be employed for a number of uses, such for example, as to floatingly support an oil line or water line extending from the shore to a vessel in the water some distance therefrom. When this pontoon is not in use the air may be removed therefrom whereupon it can be rolled up into the compact package shown in Fig. 5, and since the hose or tube T forming this pontoon was vulcanized in a flat condition, it can be rolled up into a much more compact package than the ordinary hose or tube which was vulcanized in a round condition.

While reference is made in the specification and claims to a rubberized fabric, it is to be understood that the term "rubber" is to be construed broadly as covering natural or artificial rubber or rubber-like materials. It will also be understood that while the weave of the fabric has been indicated in Figs. 6 to 11 inclusive, such weave may be completely concealed in the actual construction by the thickness of the rubber.

Having thus described our invention, what we claim and desire to protect by Letters Patent is:

1. The method of producing a hose or tube of great length, which consists in folding inwardly toward each other the longitudinal side portions of a strip of rubberized fabric and securing the edges of these side portions together to form a tube, providing an agent within the tube that will prevent the inner walls thereof from adhering together, and then progressively introducing lengthwise portions of the tube in a flat condition into a vulcanizing press in the presence of heat to thereby vulcanize successive portions of the tube in a flatly pressed condition so that the tube normally will lie flat and permanent lines of fold are formed along the opposite sides of the tube.

2. The method of manufacturing a hose or tube in a flat condition, which consists in folding inwardly toward each other into flat overlying relation the longitudinal side portions of a strip of rubberized fabric, securing the edges of these side portions together to form a flattened tube, providing an adhesive preventing agent within the flat tube to prevent its walls from adhering together as the tube is vulcanized, introducing the tube in a flat condition into a vulcanizing platen press so that its walls will contact entirely across the tube, and vulcanizing the tube in a completely flat condition so that it normally will lie flat and have permanent lines of fold formed along its opposite edges.

3. The method of manufacturing a hose or tube in a flat condition, which consists in folding inwardly toward each other into flat overlying relation the longitudinal side portions of a strip of rubberized fabric, securing the edges of these side portions together to form a flattened tube, providing an adhesive preventing agent within the flat tube to prevent its walls from adhering together as the tube is vulcanized, introducing the tube in a flat condition into a vulcanizing platen press so that its walls will contact entirely across the tube, supporting the outer edges of the folded tube in the press against spreading, and heating the press to thereby vulcanize the tube in a completely flat condition so that it normally will lie flat.

4. The method of manufacturing a hose or tube in a flat condition, which consists in folding a plurality of rubberized fabric strips one about the other with their edges secured together to form a multi-ply tube in which the seam formed by the edges of one strip is well spaced from the seam formed by the edges of the other strip, providing a coating agent within the tube that will prevent the inner walls thereof from adhering together as the tube is vulcanized, introducing the tube in a flat condition into a vulcanizing press so that its walls will contact across the tube, and vulcanizing the tube in a completely flat condition so that it normally will lie flat and have permanent lines of fold formed along its opposite edges.

JOHN A. MULLER.
LAWRENCE CRANSTON.